United States Patent
Wilms

[15] 3,656,829
[45] Apr. 18, 1972

[54] ASSEMBLY FOR A STEREOSCOPIC MICROSCOPE

[72] Inventor: Karl-Heinz Wilms, Dachau, Germany

[73] Assignee: Optische Werke G. Rodenstock, Munich, Germany

[22] Filed: Apr. 15, 1970

[21] Appl. No.: 28,784

[30] Foreign Application Priority Data

Apr. 19, 1969 Germany......................P 19 20 006.7

[52] U.S. Cl..................................................350/33, 351/14
[51] Int. Cl.............................................................G02b 23/00
[58] Field of Search..................................350/31–36; 351/3, 351/14

[56] References Cited

UNITED STATES PATENTS

| | | | |
|---|---|---|---|
| 2,286,430 | 6/1942 | Minton et al.......................... | 350/33 X |
| 1,470,770 | 10/1923 | Siedentopf........................... | 350/33 X |
| 3,355,979 | 12/1967 | Wirtanen............................. | 350/33 X |
| 3,433,560 | 3/1969 | Gambs.................................. | 351/14 |

*Primary Examiner*—David Schonberg
*Assistant Examiner*—Robert L. Sherman
*Attorney*—Hans Berman

[57] ABSTRACT

A stereoscopic microscope is built around a basic unit having a housing, adapters on three walls of the housing for securing an entrance objective, binocular eyepieces, and an auxiliary unit, such as an illuminator or a camera, to the housing. A beam splitting mirror in the housing permits light to be transmitted between the auxiliary unit and the objective while light also is transmitted between the objective and the eyepieces. The magnification of the microscope can be changed by two Galilean telescopes reversibly mounted on a rotary carrier between the mirror and the eyepiece adapter.

8 Claims, 4 Drawing Figures

ASSEMBLY FOR A STEREOSCOPIC MICROSCOPE

This invention relates to microscopes, and particularly to microscopes of the type in which a single entrance objective faces the object to be viewed and produces an image of the viewed object at an infinite distance, the image is viewed through two viewing telescopes or telescopic eyepieces, and a binocular magnification changing device is interposed between the objective and the telescopes.

More specifically, the invention aims at providing a versatile basic unit from which variations of the microscope briefly described above can be assembled by interchanging parts.

With this object and others in view, the invention provides an assembly for use in a stereoscopic microscope having an entrance objective adapted to produce an image of an object, two viewing telescopes for binocularly viewing the image, and a magnification changing device interposed between said entrance objective and said telescope for varying the magnification of the viewed object.

In its basic aspects, the assembly comprises a housing including three walls, and respective adapters on these walls. The first adapter can releasably fasten the entrance objective to the housing. The second adapter may releasably fasten the viewing telescopes to the housing, and the third adapter is operative for releasably securing an auxiliary optical system to the housing. A carrier is mounted in the housing for movement between two positions and carries an optical system which transmits the image produced by the entrance objective to the two telescopes in each of the two carrier positions, the magnification of the image being different in the two positions. The carrier and the optical system thereon constitute elements of the afore-mentioned magnification changing device. A beam splitter is mounted in the housing and interposed between the carrier and the first adapter to pass light simultaneously between the first and third adapters, and between the first and second adapters.

Other features, additional objects, any many of the attendant advantages of this invention will readily be appreciated as the same becomes better understood by reference to the following detailed description of preferred embodiments when considered in connection with the appended drawing in which.

Figure 1:
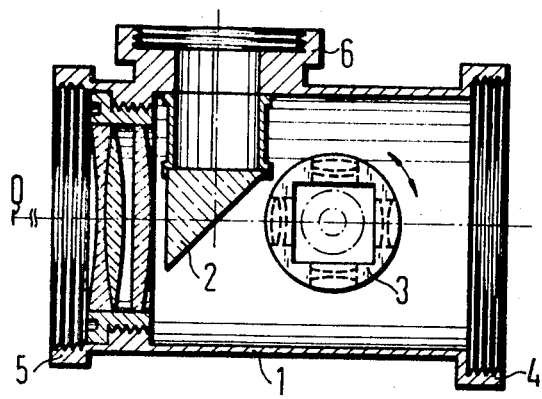
FIG. 1 shows the basic unit of the invention with an attached entrance objective in elevational section.

Referring initially to FIG. 1, there is shown a generally rectangular housing 1 enclosing elements of an optical system aligned along the longitudinal axis of the housing. They include a semi-transparent mirror 2 arranged at an angle of 45° to the housing axis to act as a beam splitter, and a cylindrical carrier drum 3 mounted in the housing for rotation about its axis which is perpendicular to the longitudinal housing axis. Two Galilean telescopes are built into the drum 3. Adapter rings 4 and 5 are mounted on axially opposite walls of the housing 1 about corresponding wall openings and are each provided with threads, one half of a bayonet closure or the like, for securing other elements of a microscope to the housing 1. In the condition of the unit illustrated in FIG. 1, an objective lens system is set into the adapter ring 5 for viewing an object O.

An adapter ring 6 on an axial wall of the housing 1 permits an auxiliary optical system to be attached to the unit shown in FIG. 1. The adapter 6 is radially aligned with the mirror 2 so that light may be transmitted simultaneously between the central openings in the adapter rings 4,5 and 5,6.

Figure 2:
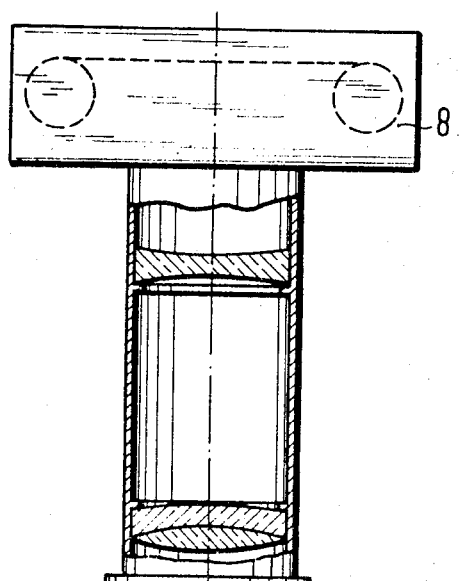
FIG. 2 illustrates a stereoscopic microscope with photographic attachment including the unit of FIG. 1 in a fragmentary view corresponding to that of FIG. 1.

As is partly illustrated in FIG. 2, a stereoscopic microscope with photographic attachment is readily assembled from the unit shown in FIG. 1 and additional elements without the use of tools. The microscope includes a binocular eyepiece 7 essentially consisting of two viewing telescopes secured to each other and releasably secured to the housing 1 by the adapter ring 4 and a corresponding connector portion of the eyepiece.

The adapter ring 6 carries the rigid lens barrel of a camera 8, which encloses an objective lens system as is conventional, the body of the camera enclosing a photographic film, other conventional elements of the camera, such as a shutter and diaphragm having been omitted together with the details of the film transport mechanism.

During operation of the afore-described microscope, the image of a viewed object is transmitted from the entrance objective in the adapter ring 5 through the two Galilean telescopes in the carrier drum 3 to the eyes of a viewer through respective viewing telescopes in the eyepiece 7. When the carrier drum is turned 180° C., and the Galilean telescopes are reversed, the magnification of the microscope is changed.

Figure 3:
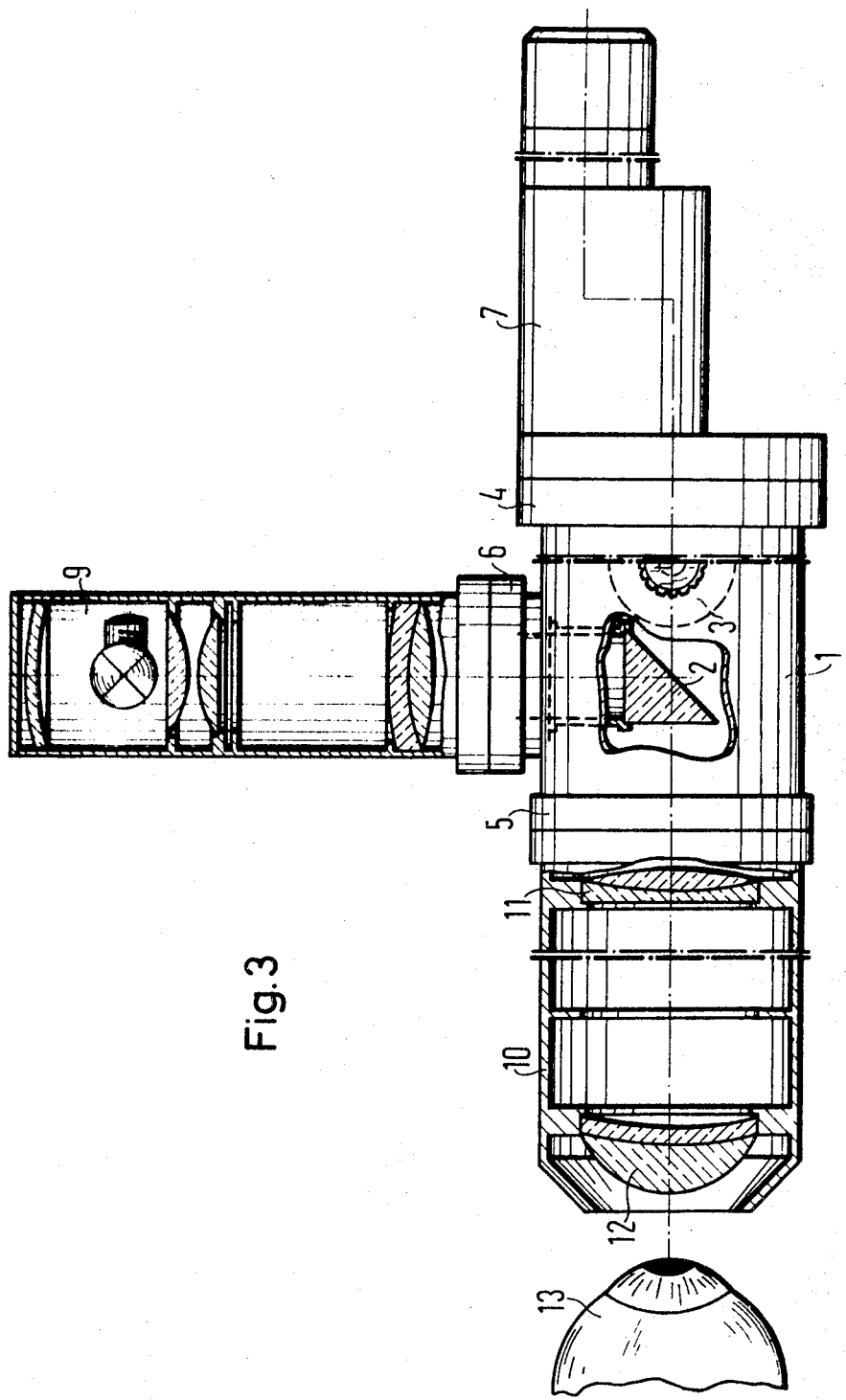
FIG. 3 shows an ophthalmological microscope assembled by means of the unit of FIG. 1.

In the ophthalmological apparatus of FIG. 3 assembled with the unit of FIG. 1, the entrance objective directly mounted in the adapter ring 5 has been replaced by a tubular attachment 10 enclosing an objective lens 11 and a magnifying eye lens 12 for inspecting the retina of an eye 13 through the binocular eyepiece 7. Instead of a camera, the attachment ring 6 of the housing 1 carries an illuminator 9, conventional in itself, and including an electric light bulb energized through a non-illustrated cable from a suitable current source, a reflector behind the bulb, and a system of condensing and focusing lenses which direct the light of the bulb toward the obliquely inclined face of the mirror 2 from which the light is reflected into the attachment 10 and the eye 13.

Figure 4:
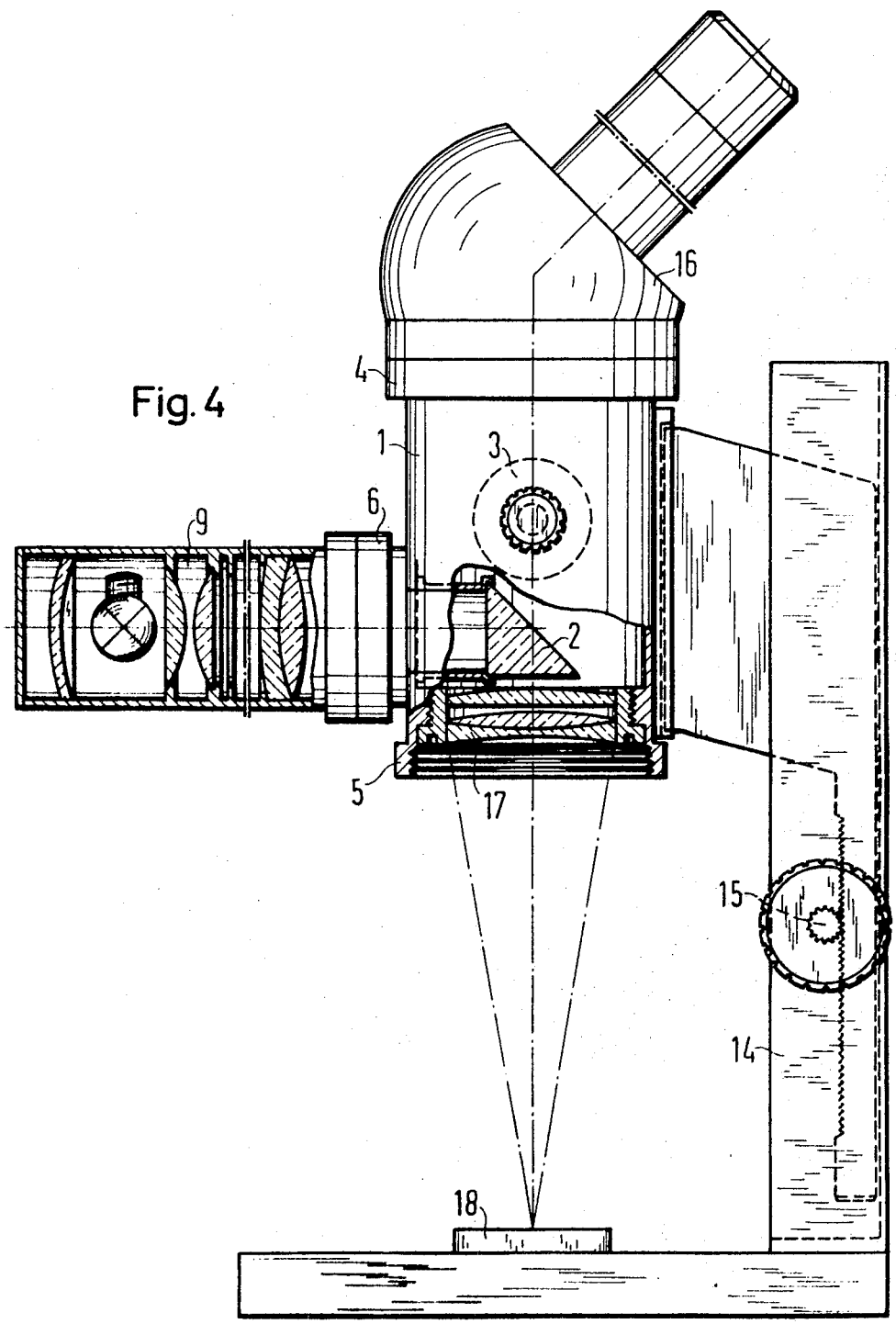
FIG. 4 shows a metallurgical microscope of the invention in elevational section.

The metallographic microscope shown in FIG. 4 combines the illuminator 9 on the adapter ring 6 with an obliquely inclined binocular eyepiece 16 on the adapter 4, and an entrance objective lens system 17 of short focal length set into the adapter ring 5.

An additional adapter on the axial wall of the housing 1 opposite the adapter ring 6 releasably secures the housing 1 to a stand 14 in a position in which the entrance system 17 faces downward toward an object 18 to be viewed and supported on the base of the stand 14. The housing 1 with the attached elements may be raised or lowered on the stand 14 by means of a concealed, conventional, rack-and-pinion drive operated by a focusing knob 15. It will be understood that a similar knob, not shown, is coaxially mounted on the carrier drum 3 outside the housing 1 for reversing the Galilean telescopes mounted on or in the drum.

Elements commonly employed in stereoscopic microscopes of the type with which this invention is concerned have been omitted from the drawing for the sake of clarity. They include a prism arrangement in the eyepieces 7,16 which permits the spacing of the two viewing telescopes to be adapted to the spacing of the pupils in the viewer's eyes, interchangeable objectives in the viewing telescopes, and the like.

Many variations are possible without departing from the spirit of the invention. The semi-transparent mirror 2 may be replaced in a known manner by an opaque mirror or prism located in that portion of the bundle of rays transmitted by the entrance objective which cannot reach the Galilean telescopes in the drum 3 so that the aperture of the circular entrance objective is more fully utilized. In either event, light is transmitted between the adapters 5 and 6 centrally between the beams directed toward the two Galilean telescopes in the drum 3 to ensure highest resolution of an image transmitted to the photographic attachment in FIG. 2 through the center of the entrance objective, and uniform illumination of the field by light derived from the illuminator.

While reversible Galilean telescopes are preferred as a magnification changing device in the apparatus of the invention, they may be replaced in a conventional manner by an erector lens system mounted on an axially movable carrier, or the like.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A stereoscopic microscope assembly comprising, in combination:
   a. a housing including three walls;
   b. first, second, and third adapter means on a first, a second, and a third one of said walls respectively;
   c. a single entrance objective releasably fastened to said first wall by said first adapter means for admitting light from a viewed object to said housing;
   d. two viewing telescopes secured to each other and releasably secured to said second wall by said second adapter means in a position for binocularly viewing said object through said single entrance objective;
   e. an auxiliary optical system releasably secured to said third wall by said third adapter means; and
   f. deflecting means in said housing for deflecting light between said objective and said auxiliary optical system.

2. An assembly as set forth in claim 1, wherein said beam deflecting means include semi-transparent mirror means fixedly mounted in said housing.

3. An assembly a set forth in claim 1, further comprising a stand, and fourth releasable adapter means securing said housing to said stand in a position in which said entrance objective faces downward.

4. An assembly as set forth in claim 1, further comprising an illuminator secured to said housing by said third adapter means, said illuminator constituting said auxiliary system.

5. An assembly as set forth in claim 1, wherein said first and second walls are opposite each third, and the other wall is transverse to said two walls.

6. An assembly as set forth in claim 5, further comprising magnification changing means interposed in said housing between said entrance objective and said telescopes for varying the magnification of the viewed object.

7. An assembly as set forth in claim 6, wherein said magnification changing means include a carrier mounted on said housing for movement between two positions and carrying optical means for transmitting the image of said object received by said entrance objective to said two telescopes in each of said two positions of the carrier, the magnification of said image being different in said two positions.

8. An assembly as set forth in claim 7, wherein said carrier is rotatably mounted in said housing, and said optical means include two Galilean telescopes mounted on said carrier and aligned with said viewing telescopes respectively in each of said positions, said positions being angularly offset about 180°.

* * * * *